(12) United States Patent
Cardillo et al.

(10) Patent No.: US 11,558,506 B1
(45) Date of Patent: Jan. 17, 2023

(54) ANALYSIS AND MATCHING OF VOICE SIGNALS

(71) Applicant: NICE LTD., Ra'anana (IL)

(72) Inventors: Peter Cardillo, Atlanta, GA (US); Jon A. Arrowood, Atlanta, GA (US); Robert Morris, Atlanta, GA (US)

(73) Assignee: NICE LTD., Ra'anana (IL)

(*) Notice: Subject to any disclaimer, the term of this patent is extended or adjusted under 35 U.S.C. 154(b) by 0 days.

(21) Appl. No.: 17/486,409

(22) Filed: Sep. 27, 2021

(51) Int. Cl.
*H04M 3/51* (2006.01)
*G10L 17/02* (2013.01)
*G10L 17/26* (2013.01)

(52) U.S. Cl.
CPC .............. *H04M 3/51* (2013.01); *G10L 17/02* (2013.01); *G10L 17/26* (2013.01); *H04M 2203/6027* (2013.01)

(58) Field of Classification Search
CPC . H04M 3/51; H04M 2203/6027; G10L 17/02; G10L 17/26
USPC .................................................... 379/114.14
See application file for complete search history.

(56) References Cited

U.S. PATENT DOCUMENTS

| | | | | |
|---|---|---|---|---|
| 6,078,807 A * | 6/2000 | Dunn | ................. | H04M 15/00 455/565 |
| 8,423,349 B1 * | 4/2013 | Huynh | ................. | G06F 40/56 704/9 |
| 8,812,318 B2 * | 8/2014 | Broman | ................. | G10L 17/00 704/250 |
| 8,924,285 B2 * | 12/2014 | Rajakumar | ......... | G06Q 20/341 713/186 |
| 9,716,791 B1 * | 7/2017 | Moran | ................. | H04M 3/5175 |
| 9,824,692 B1 * | 11/2017 | Khoury | ................. | G10L 17/08 |
| 10,659,588 B1 * | 5/2020 | Guan | ................. | H04M 3/385 |
| 2002/0010587 A1 * | 1/2002 | Pertrushin | ............ | G10L 17/26 704/275 |
| 2015/0195406 A1 * | 7/2015 | Dwyer | ................. | G10L 15/02 379/265.07 |
| 2018/0082689 A1 * | 3/2018 | Khoury | ................. | G06N 7/005 |
| 2018/0190296 A1 * | 7/2018 | Williams | ................ | G10L 17/00 |
| 2019/0116136 A1 * | 4/2019 | Baudart | ............ | H04L 63/1416 |

OTHER PUBLICATIONS

Alex Park, et al.; "Towards Unsupervised Pattern Discovery in Speech"; 2005; pp. 53-58; MIT Computer Science and Artificial Intelligence Laboratory; Cambridge, MA 02139.

\* cited by examiner

*Primary Examiner* — Binh Kien Tieu
(74) *Attorney, Agent, or Firm* — Haynes and Boone, LLP

(57) ABSTRACT

Methods for detecting fraud include receiving a plurality of call interactions; extracting a voice print of a caller from each of the call interactions; determining which call interactions are associated with a single caller by comparing and matching pairs of voice prints of the call interactions; organizing the call interactions associated with a single caller into a group; and determining that a matching phrase was spoken by the single caller in a first call interaction and second call interaction in the group.

17 Claims, 6 Drawing Sheets

ANALYSIS AND MATCHING OF VOICE SIGNALS

TECHNICAL FIELD

The present disclosure relates generally to analysis of voice signals, and more specifically to systems and methods for matching audio files associated with a voice spoken by a single caller.

BACKGROUND

Fraud in a call center or contact center can be found by finding the same person calling in on different accounts. Current fraud detection systems generally use text-independent voice biometrics. Text-independent voice biometrics can take two utterances of speech and detect if it is the same person on two calls. It does not require use of the same words. It is therefore very general and can be applied to any pair of calls. After a prospective match is discovered, a reviewer typically evaluates matching files and needs to determine if it is the same person in the two files. This is, however, time consuming and expensive, and computer-processing-power intensive.

Current methods that use text-independent voice biometrics to find the same caller on different accounts often also requires too much human review. Many callers sound very similar, and listening to two different calls to decide if it is the same person can take minutes for each pair of calls. It is simply not practical for a human to listen to two files, and while listening, remembering if the other call had the same phrase, and then be able to quickly locate the other example and compare it. Many voices sound very similar, and it can take several minutes to manually review the two calls. A large call center can create thousands of possible fraud pairs per day.

Accordingly, a need exists for improved systems and methods for detecting fraud in call interactions.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
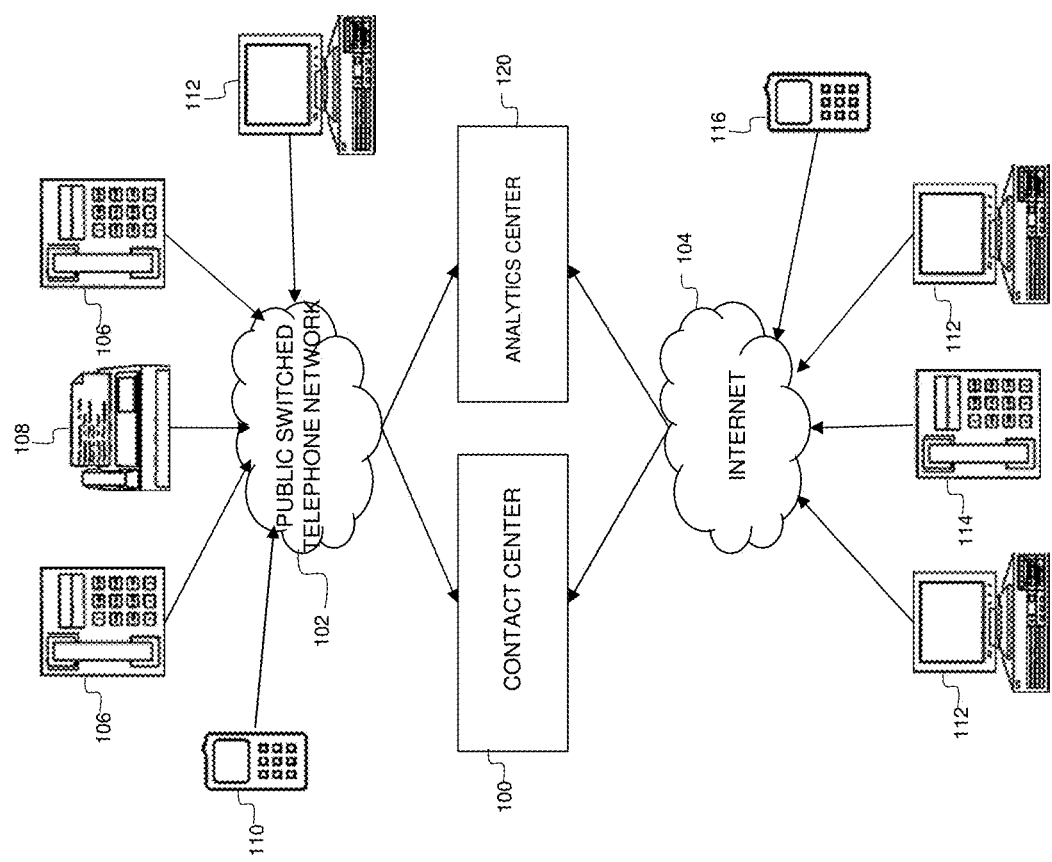
FIG. 1 is a simplified block diagram of an embodiment of a contact center according to various aspects of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Conventional systems and methods find callers that sound the same using text-independent voice biometrics. The present systems and methods add a new processing layer to increase the accuracy, precision, and speed of detection of a fraudulent caller. The added processing layer reduces effort needed to review the call interactions tremendously. Once two call interactions are found that have very similar sounding callers based on text-independent voice biometrics, this new processing layer searches those call interactions for the callers saying the same phrase using a text-dependent voice biometric system. The corresponding portions of the call interactions associated with the same phrase may be extracted and processed, before providing the phrase as an audio output to a reviewer (e.g., a human reviewer, a computer-based voice reviewing engine, etc.) Hearing the same person say the same phrase not only gives acoustic clues, but also gives intonation and phrasing information. Advantageously, a reviewer (also referred to herein as a user) can quickly confirm that it is indeed the same person in the two call interactions in a matter of seconds with the synergistic efficient additional processing layer.

Fraudulent callers ("fraudsters") often repeat the same phrases when calling over and over. Fraudsters often use unique phrasing that make it apparent that it is the same person (e.g., "I'll give my social if that's okay with ya."). The systems and methods described herein use the technique described herein to search two putative call interactions for the same person saying any matching phrase (e.g., any repeated acoustic sequences), anywhere in two call interactions. The technique does not use automatic speech recognition (ASR), nor is it language dependent (i.e., text-independent).

Matched phrases are scored with text-dependent voice biometrics, which is much more accurate than the use of text-independent voice biometrics alone. Once a match is found, a reviewer is presented with the same phrase from the two call interactions. Validating using the same phrase is much easier and more efficient for the reviewer. Each matching phrase is usually only 1-3 seconds, so a decision can be made in a few seconds. When the fraudster uses unique phrasing, the confirmation is much more obvious. This makes it easier and faster to determine if it is the same person in the two call interactions. Other approaches just point the reviewer to two files to listen carefully to attempt to determine if it is the same person. Once it is determined that it is the same person, the reviewer can evaluate the whole call interaction for further confirmation, and the present disclosure eliminates this cumbersome, slow matching process.

Text-dependent voice biometrics compares two examples of the exact same phrase to determine if it is the same person. Using text-dependent voice biometrics is more discriminating, e.g., it is easier to distinguish two different callers and to identify the same caller. In typical text-dependent systems, the phrase to be identified is usually pre-determined by the system or picked by the user. Moreover, text-dependent voice biometrics generally just compare two audio samples from beginning to end. Text-dependent voice biometrics tends to have considerably better precision, but it is more difficult to use because the caller needs to say the correct phrase both times, and the endpoints of the utterance need to be found precisely.

In contrast, the present methods and systems do not need to know the text of what was said. The algorithm does not use speech recognition or phonetic information, so it is completely language agnostic. A user does not need to specify what phrases to look for in searching a conversation. Instead, the algorithm can be trained to look for any same voice sequence in two call interactions. The algorithm searches two call interactions to find where a matching phrase was said anywhere in each call interaction. In an exemplary embodiment, two entire call interactions are searched with a pair of sliding windows in a computationally efficient way to determine whether a matching phrase was used in both call interactions. Once a matching phrase is found in two call interactions, the reviewer is presented with the two examples of the same person saying the same phrase.

FIG. 1 is a simplified block diagram of an embodiment of a contact center 100 according to various aspects of the present disclosure. The term "contact center," as used herein, can include any facility or system server suitable for receiving and recording electronic communications from contacts. Such contact communications can include, for example, call interactions, chats, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include contact tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a contact (or caller) and a contact center agent during fulfillment of a contact and agent transaction. In one embodiment, the contact center 100 records all of the contact interactions in uncompressed audio formats. In the illustrated embodiment, contacts may communicate with agents associated with the contact center 100 via multiple different communication networks such as a public switched telephone network (PSTN) 102 or the Internet 104. For example, a contact may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

As one of ordinary skill in the art would recognize, the illustrated example of communication channels associated with a contact center 100 in FIG. 1 is just an example, and the contact center may accept contact interactions, and other analyzed interaction information and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
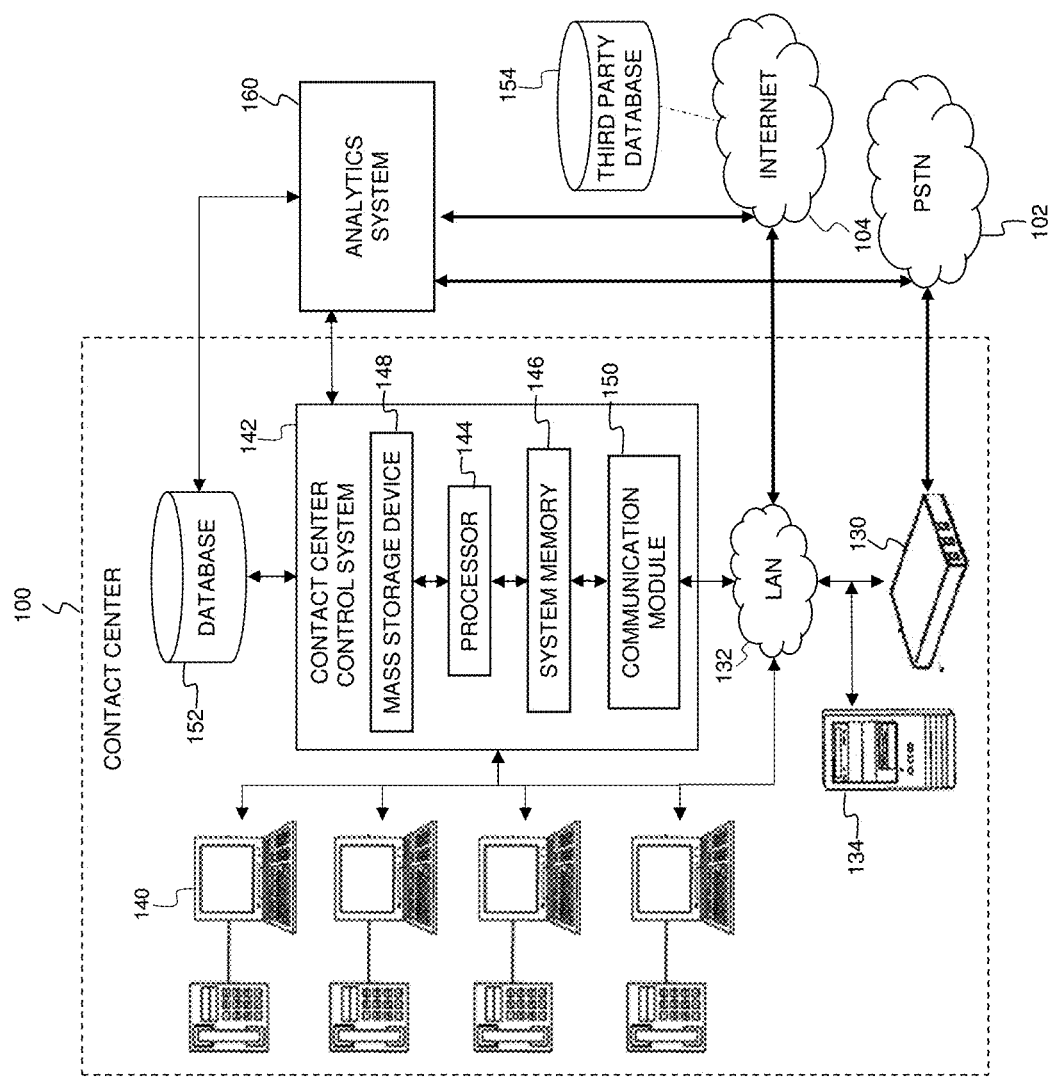
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130 and/or ACD 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

Often, in contact center environments such as contact center 100, it is desirable to facilitate routing of contact communications, particularly based on agent availability, prediction of profile (e.g., personality type) of the contact occurring in association with a contact interaction, and/or matching of contact attributes to agent attributes, be it a telephone-based interaction, a web-based interaction, or other type of electronic interaction over the PSTN 102 or Internet 104. In various embodiments, ACD 130 is configured to route contact interactions to agents based on availability, profile, and/or attributes.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a contact over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in contact interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the contact, respond to email inquiries, receive faxes, engage in instant message conversations, text (e.g., SMS, MMS), respond to website-based inquires, video chat with a contact, and otherwise participate in various contact interaction sessions across one or more channels including social media postings (e.g., Facebook, LinkedIn, etc.). Further, in some embodiments, the agent workstations 140 may be remotely located from the contact center 100, for example, in another city, state, or country. Alternatively, in some embodiments, an agent may be a software-based application configured to interact in some manner with a contact. An exemplary software-based application as an agent is an online chat program designed to interpret contact inquiries and respond with pre-programmed answers.

The contact center 100 further includes a contact center control system 142 that is generally configured to provide recording, voice analysis, fraud detection analysis, behavioral analysis, text analysis, storage, and other processing functionality to the contact center 100. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a microprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as voice prints, may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as contact interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze contact voice data and other structured and unstructured data, and other tools may be used in association therewith to increase efficiency and efficacy of the contact center. As an aspect of this, the control system 142 is operable to record unstructured interactions between contacts and agents occurring over different communication channels including without limitation call interactions, email exchanges, website postings, social media communications, smartphone application (i.e., app) communications, fax messages, texts (e.g., SMS, MMS, etc.), and instant message conversations. An unstructured interaction is defined herein as a voice interaction between two persons (e.g., between an agent of the contact center 100 such as call center personnel or a chatbot, and a caller of the contact center 100, etc.) that include phrases that are not predetermined prior to the voice interaction. An example of an unstructured interaction may include the agent asking the caller "what can I help you with today," to which the caller may answer with any possible answers. By contrast, a structured interaction is defined as a sequence of phrases between the two persons that are predetermined prior to the voice interaction. An example structured interaction may include the agent asking the caller "are you looking to change an address or withdraw money today," to which the caller may only be able to answer based on any one of the two predetermined phrases—"change an address" or "withdraw money."

The control system 142 may include a hardware or software-based recording server to capture the audio of a standard or VoIP telephone connection established between an agent workstation 140 and an outside contact telephone system. Further, the audio from an unstructured telephone call or video conference session (or any other communication channel involving audio or video, e.g., a Skype call) may be transcribed manually or automatically and stored in association with the original audio or video. In one embodiment, multiple communication channels (i.e., multi-channel) may be used, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to contacts, agents, and their interactions. For example, in one embodiment, a "cradle-to-grave" recording may be used to record all information related to a particular telephone call from the time the call enters the contact center to the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific contacts may be collected and associated with each contact, including without limitation the number and length of calls placed to the contact center, call origination information, reasons for interactions, outcome of interactions, average hold time, agent actions during interactions with the contact, manager escalations during calls, types of social media interactions, number of distress events during interactions, survey results, and other interaction information. In addition to collecting interaction data associated with a contact, the control system 142 is also operable to collect biographical profile information specific to a contact including without limitation contact phone number, account/policy numbers, address, employment status, income, gender, race, age, education, nationality, ethnicity, marital status, credit score, contact "value" data (i.e., contact tenure, money spent as contact, etc.), personality type (as determined based on past interactions), and other relevant contact identification and biological information. The control system 142 may also collect agent-specific unstructured and structured data including without limitation agent personality type, gender, language skills, technical skills, performance data (e.g., contact retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, contact data, agent data, and telephony data may be collected and processed by the control system 142.

The control system 142 may store recorded and collected interaction data in a database 152, including contact data and agent data. In certain embodiments, agent data, such as agent scores for dealing with contacts, are updated daily or at the end of an agent shift.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for contact data such as credit reports, past transaction data, and other structured and unstructured data.

Additionally, in some embodiments, an analytics system 160 may also perform some or all of the functionality ascribed to the contact center control system 142 above. For instance, the analytics system 160 may record telephone and internet-based interactions, convert discussion to text (e.g., for linguistic analysis or text-dependent searching) and/or perform behavioral analyses. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

Figure 3:
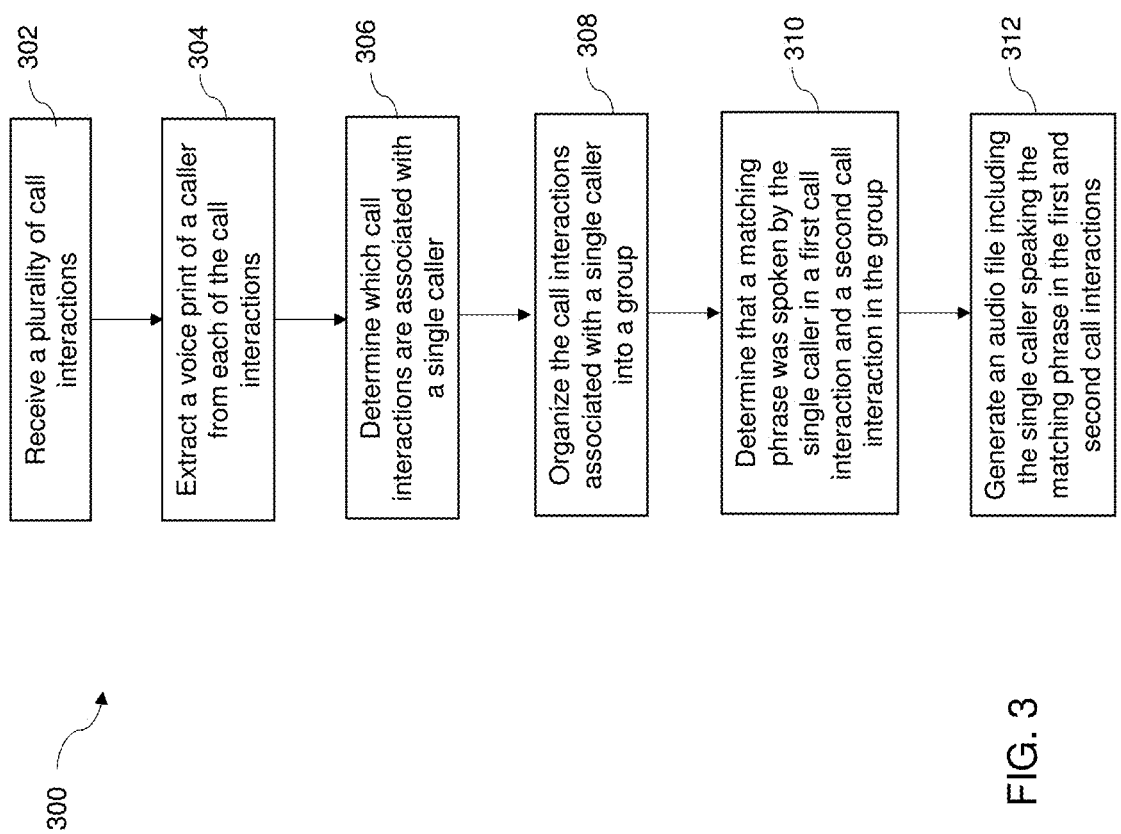
FIG. 3 is a flowchart of a method according to embodiments of the present disclosure.

Referring now to FIG. 3, a method 300 according to embodiments of the present disclosure is described. At step 302, control system 142 receives a plurality of call interactions. At least some of the plurality of call interactions include unstructured interactions between an agent and a caller. Examples of call interactions include customer service and support calls.

In some embodiments, control system 142 filters the plurality of call interactions to identify high-risk call interactions before moving to step 304. This is done by using queries (phonetic or ASR-based) to find call interactions in which addresses are changed, money is transferred, or both. This filtering stage is not necessary, but it can be used to efficiently reduce computation and labor in the reviewing process.

At step 304, control system 142 extracts a voice print of a caller from each of the call interactions from the plurality of call interactions. The term "voice print" as used herein, means a representation of a human voice that uniquely identifies an individual. In one embodiment, a voice print is an electronically recorded graphic representation of a person's voice. Typically, a voice print represents a set of measurable characteristics of a human voice. Like a fingerprint, a voice print for any individual is distinctive.

In several embodiments, control system 142 extracts at least a portion of the caller's voice to create a voice print of the caller, typically in digital form for computer processing and eventual storage. Characteristic, i.e., person-dependent, features from the caller's voice are extracted from the call interaction, thus generating one or more sequences of feature vectors. The one or more sequences of feature vectors are used to construct a caller voice print, and the voice print may subsequently be stored. The goal of feature selection is to find a transformation of the caller's voice that preserves the more pertinent information to identifying the caller's voice (or at least uniquely categorizing it) while enabling meaningful comparisons to be performed using simple measures of similarity.

At step 306, control system 142 determines which call interactions are associated or are likely associated with a single caller by comparing and matching pairs of voice prints of the call interactions. For example, control system 142 attempts to find pairs of call interactions that are the same caller, but have different customer IDs by comparing voice prints. If comparison of the voice prints exceeds a certain threshold similarity score, the voice prints can be deemed to be associated with a single caller. The goal is to expose fraudsters having the same voice prints that are calling in on different accounts.

At step 308, control system 142 organizes the call interactions that are associated or are likely associated with a single caller into a group. Thus, all the call interactions that appear to be the same caller, based on comparison of voice prints, are grouped together.

Typically, after step 308, a user conventionally has had to listen to the putative matches and decide if it truly the same person on two call interactions. In practice, this turns out to be quite difficult and time consuming. When control system 142 looks through hundreds of thousands of call interactions it will naturally find and present to the user many people that sound very similar. Background noise and channel artifacts can make different people sound very similar also. Thus, the user is pointed to two multi-minute call interactions, and the user is responsible for jumping into the call interaction to determine if there is a match. This practice is very time consuming, frustrating, and prone to error.

Therefore in the present methods, at step 310, control system 142 determines that a matching phrase was spoken by the single caller in two call interactions (i.e., a first call interaction and a second call interaction) in the group. It has been found that fraudsters often repeat the same phrasing and intonation when calling in multiple times. The method 300 uses this fact to make the process much more efficient. Method 300 inserts a new stage of processing that reviews the putative matches and tries to find if a caller used the same phrase in the two call interactions. In certain embodiments, the start and end times of these phrase matches are retained. In various embodiments, all call interactions that appear to be from the same caller (e.g., the caller used the same phrase on two or more call interactions) are clustered so they can be reviewed together, and one decision can be made for the whole cluster. Now when a user sees an audio file, he or she is presented with the matching phrase directly.

Figure 4:
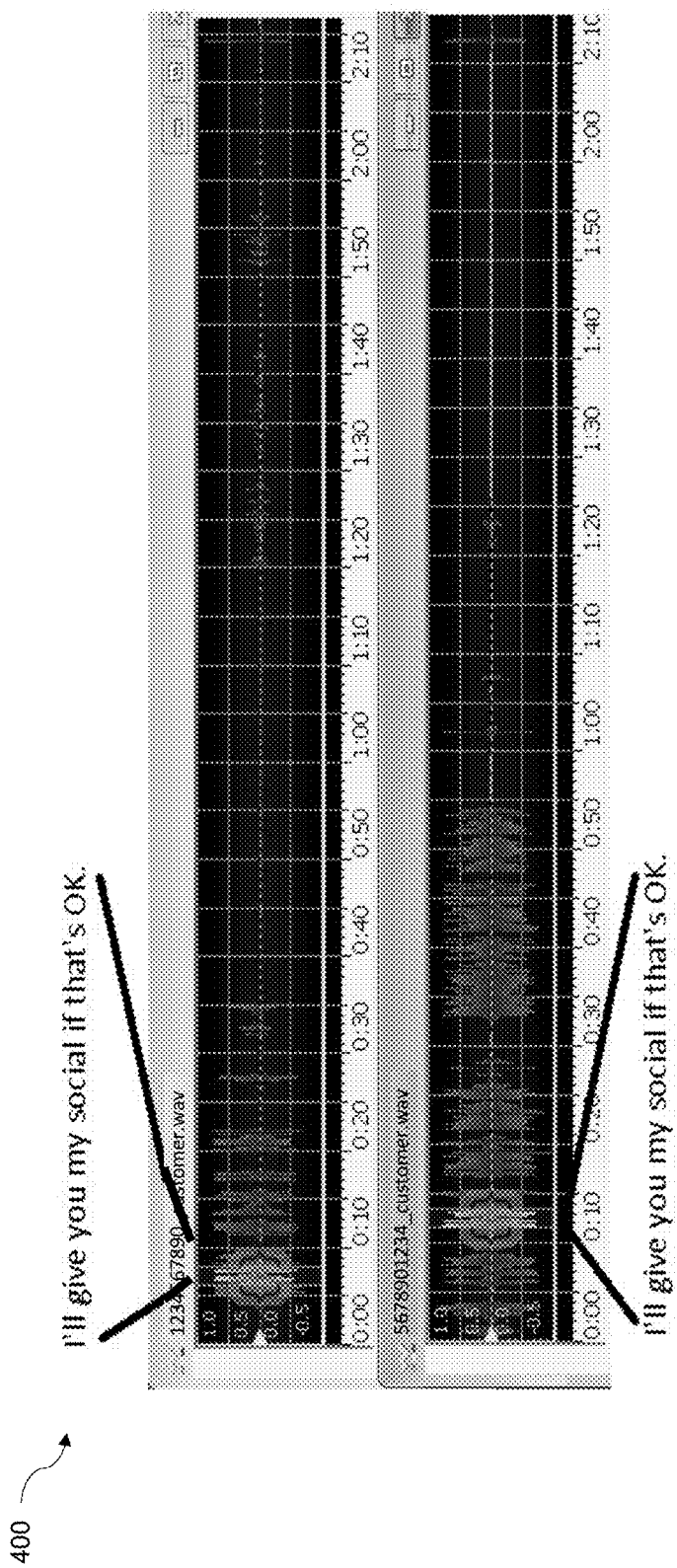
FIG. 4 is an exemplary audio file according to embodiments of the present disclosure.

Referring now to FIG. 4, an exemplary audio file 400 is shown on a user interface. When a user clicks on the audio file 400, the user hears:

*short beep*
"I'll give you my social if that's OK."
*short beep*
"I'll give you my social if that's OK."

This can be repeated for other matches in a cluster. Given the fact that the voice sounds the same and the fact that the same phrasing was used helps rapidly confirm that it is the same person with much more certainty than just hearing that the same person sounds the same. Since the phrase is generally under two seconds, the review of the match can be done in, for example, five seconds. Hearing the same person say the same phrase makes several of the confirmations very obvious and quick. After confirming that it is the same person, the user can be provided access to the entire two call interactions and can listen to confirm that the caller is claiming to be a different person in the two call interactions.

This process adds a substantial efficiency. In an example, a group of several people worked for several days to review call interactions to find fraudsters. After this process was run, a similar number of fraudsters were found by a single person using method 300 with a few hours of work.

Control system 142 applies a phrase matching algorithm that uses text-dependent biometrics. Typically, text-dependent voice biometrics compares two utterances directly (i.e., the endpoints are known), and measures how likely it is to be the same person saying the same phrase. In the present systems and methods, the algorithm was modified to compare every offset in a first call interaction to every offset in a second call interaction. This is necessary because due to the unstructured nature of the call interactions, it is not known where in either call interaction the same phrase might have been said. In an exemplary embodiment, this is done efficiently by first calculating and storing the voice biometric distances between all frames of speech in the two call interactions, and then applying a sliding dynamic time warping algorithm to compute a warping distance between each frame of speech in the first call interaction and each frame of speech in the second call interaction.

Since a call interaction may include periods of silence and irrelevant background noise such as music, traffic noise, etc., a voice activity detector (VAD) may be used to isolate speech segments produced by the caller within each of the two call interactions. Each speech segment may include one or more uninterrupted phrases produced by the caller. In certain embodiments, determining that a matching phrase was spoken includes (i) converting a speech segment in the first call interaction and a speech segment in the second call interaction into feature vectors, wherein each feature vector corresponds to each frame (e.g., a 10 ms frame) of speech, (ii) calculating a distance between each frame of speech in the first call interaction and each frame of speech in the second call interaction, (iii) storing the calculated distances in a matrix, and (iv) starting at each frame of speech in the first call interaction and each frame of speech in the second call interaction, computing, with a sliding dynamic time warping algorithm, a warping distance.

Converting Speech Segments into Feature Vectors. In various embodiments, the determination begins by dividing each of the first call interaction and the second call interaction into a plurality of speech segments. In some embodiments, a single speech segment for each call interaction is possible.

Figure 5:
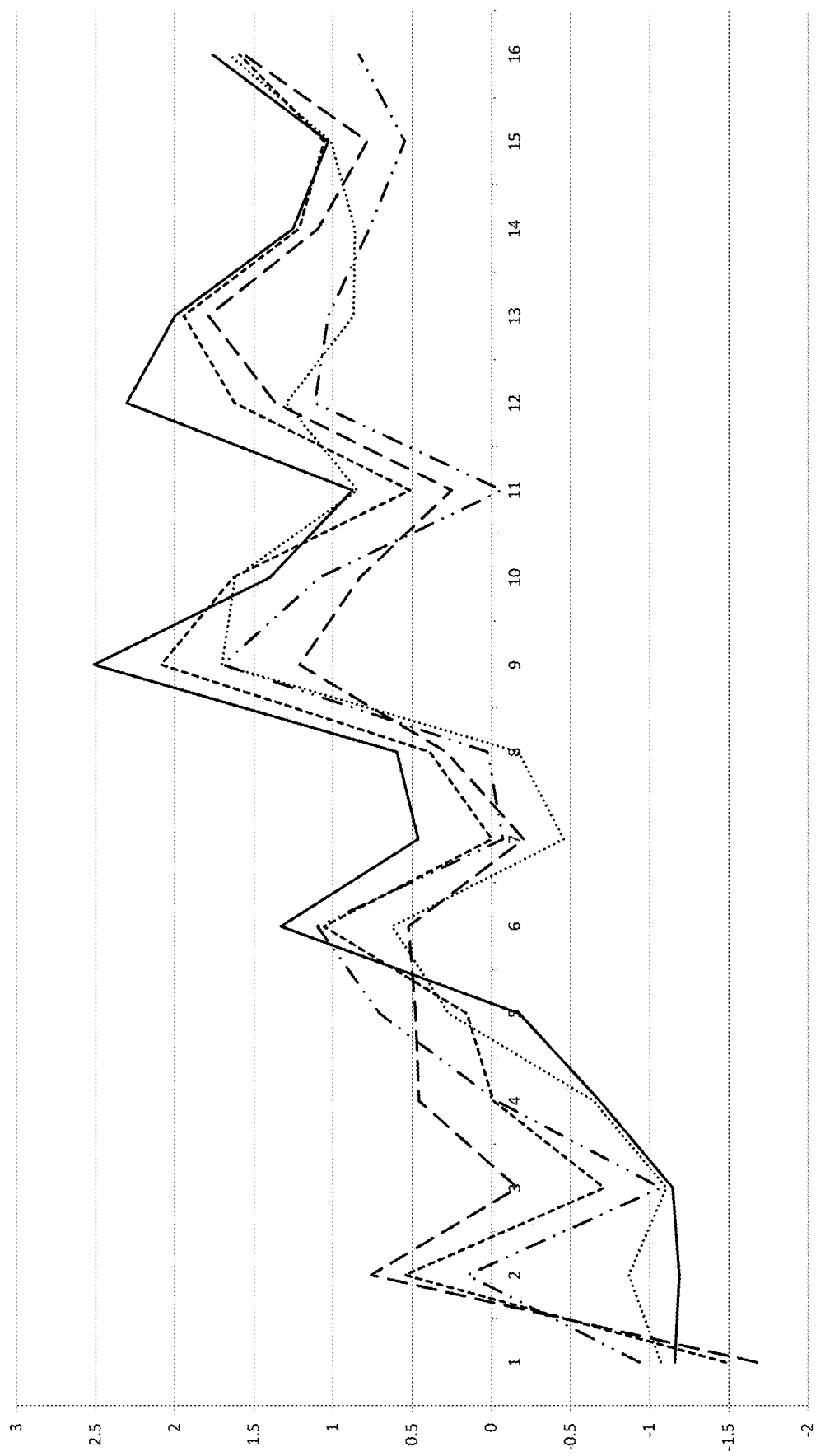
FIG. 5 illustrates exemplary feature vectors according to embodiments of the present disclosure.

In several embodiments, an audio signal from the contact side of the call interaction is run through a VAD classifier that finds areas of speech and ignores areas of silence, noise or music. Each of these speech segments may be further divided into frames of speech. For example, a frame may include a 10 ms window of a speech segment. Thus, 100 frames may be determined for each second of a speech segment. Energy features may then be extracted for each frame of speech. In some embodiments, a feature extractor (e.g., a standard Mel-spaced filter bank feature extractor) can create energy features (e.g., 16 log energy features) per frame of the speech segment. These features are then linearly transformed to create, for example, 16 feature vectors that are used for computing distances between frames of speech. In one embodiment, feature vectors are extracted for each frame of speech. FIG. 5 illustrates exemplary feature vectors. The feature vectors can include any kind of feature vector. In one embodiment, the feature vectors include voice biometric feature vectors. In another embodiment, the feature vectors include Mel frequency cepstral coefficients (MFCCs) or filter banks.

Calculating and Storing Frame Level Distance. Once the feature vectors are extracted from each frame of speech, the similarity between frames of speech in the first call interaction and the frames of speech in the second call interactions is determined by calculating the distance between each frame of speech in the first call interaction and each frame of speech in the second call interaction. For example, for each frame in the first call interaction $A=0 \ldots N_A$ and each frame in the second call interaction $B=0 \ldots N_B$, the distance is computed between the feature vectors, where $N_A$ and $N_B$ are the number of frames in the first call interaction and the second call interaction, respectively. These distances are typically stored in a matrix.

The smaller the distance, the more similar the two frames of speech. In other words, the smaller the distance, the more likely that the same word(s) were spoken in the two frames. The distance can be measured in any suitable manner. In one embodiment, the distance measured is a Euclidean distance. In other embodiments, the distance measured is Manhattan distance (L1 distance).

Computing a Warping Distance Using a Sliding Dynamic Time Warping Algorithm. Dynamic time warping (DTW) is an algorithm used to measure similarity between two sequences (e.g., two audio clips) that may vary in time or speed. For example, the algorithm matches two temporal sequences allowing the two examples to occur at differing speeds. In various embodiments, a sliding window is used to segment the first and second call interactions into several short subsequences (i.e., one or more frames of speech), and DTW is used to measure the similarity of each pair of short subsequences. The sliding DTW algorithm allows matching of subsequences within the call interactions. In some embodiments, the short subsequence from the first call interaction may have a different length (e.g., different number of frames) from the short subsequence from the second call interaction.

Once the frame level distances are computed and stored in the matrix, a warping distance through the matrix is computed, starting at each frame of speech in the first call interaction and each frame of speech in the second call interaction. The warping distance is the sum of the minimum frame level distances that were previously stored. In certain embodiments, the warping distance is computed by calculating the distance between two or more sequential frames of speech in the first call interaction and two or more sequential frames of speech in the second call interaction. The goal is to find the smallest warping distance having a minimum length L. The minimum length is used to prevent false matches between short segments within each call interaction. In some embodiments, the warping distance is stored in the matrix.

In an exemplary embodiment, the code for finding a matching phrase using sliding DTW is as follows:

```
L_min = 100; //The minimum length of a match in
centiseconds (frames). Typically 100
L_max = 200; //The maximum length of a match in
centiseconds (frames). Typically 200
for( a=0; a<N_A; a+=1 )
{
   for( b=0; b<N_B; b+=1 )
   {
   for( L=L_min; L<L_max; L+=1 )
   {
      Find min warping distance starting at frame a in call A
      and frame b in call B with match length L
   }
   }
}
```

In some embodiments, subsequences from the first call interaction and the second call interaction may be determined to be matching when the warping distance between the subsequences is below a threshold value. When a pair of matching subsequences from the first call interaction and the second call interaction are determined, the matching subsequences may be extracted from the first call interaction and the second call interaction, respectively. In some embodiments, multiple pairs of matching subsequences may be determined from the first call interaction and the second call interaction. When multiple pairs of matching subsequences are determined, all of the matching subsequences are extracted from the corresponding call interactions. The matched subsequences from each of the call interactions may be combined (e.g., appending one matched subsequence to another matched subsequence from the same call interaction). In some embodiments, the matched subsequences from each of the call interactions are combined in an order such that the combined subsequences from the first call interaction correspond to the combined subsequences from the second call interaction (e.g., words are spoken in the same order in both combined subsequences). In some embodiments, when the speeds of utterance are different between the two call interactions, one or both of the combined subsequences may be modified such that the words spoken in both combined subsequences at substantially similar speed (e.g., within a threshold of each other, etc.).

At optional step 312, control system 142 generates an audio file. The audio file includes the single caller speaking the matching phrase in a first call interaction and the single caller speaking the matching phrase in a second call interaction. In some embodiments, an audio signal (e.g., a beep)

is inserted in the audio file between the combined subsequences of the two call interactions.

In various embodiments, the audio file is presented to the user. In some embodiments, control system 142 presents the first interaction and the second interaction to the user.

In some embodiments, control system 142 scores each comparison or computation based on its warping distance, where a lower warping distance is given a higher score. In certain embodiments, control system 142 presents the score for the computation, along with start and end times for the matching phrase in the first call interaction and the second call interaction.

In several embodiments, control system 142 generates and provides a list containing file names and time offsets to the user, and plays back the matching phrase from the first call interaction and/or the second call interaction for the user.

In various embodiments, the best score (e.g., lowest warping distance) in the comparison is provided to the user with start and end times for each call interaction. The best score is also provided. Files with good scores often have correct matches corresponding to the same person saying the same phrase in the call interactions. Therefore, clusters that have the highest scores can be presented to the user first as they are most likely to have the same person calling on different accounts. Table 1 below is an example of what can be provided to the user. For example, the first row (file index 7) provides the two file names with the highest likelihood of being a match, including the start and end times of the matching phrase in each file.

604 executing one or more sequences of one or more instructions contained in system memory component 606. Such instructions may be read into system memory component 606 from another computer readable medium, such as static storage component 608. These may include instructions to receive a plurality of call interactions, extract a voice print from each of the call interactions, determine which call interactions are associated with a single caller by comparing and matching pairs of voice prints of the call interactions, organize the call interactions associated with a single caller into a group, determine that a matching phrase was spoken by the single caller in two call interactions in the group, and generate an audio file wherein the audio file includes the single caller speaking the matching phrase in a first call interaction and the single caller speaking the matching phrase in a second call interaction. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, volatile media includes dynamic memory, such as system memory component 606, and transmission media includes coaxial cables, copper wire, and fiber optics, including wires that include bus 602. Memory may be used to store visual representations of the different options for searching or auto-synchronizing. In one

TABLE 1

EXAMPLE OUTPUT

| File Index | TIVB Score | TDVB Score | FilenameA | Customer IDA | ClipStartA (ms) | ClipEndA (ms) | FilenameB | Customer IDB | ClipStartB (ms) | ClipEndB (ms) |
|---|---|---|---|---|---|---|---|---|---|---|
| 7 | 80.978 | −5.741 | File07566.nmf | 6.54E+08 | 38640 | 40730 | File72810.nmf | 9.66E+08 | 39110 | 41200 |
| 27 | 80.352 | −5.852 | File92647.nmf | 1.65E+08 | 40380 | 42450 | File60029.nmf | 4.52E+08 | 46050 | 48120 |
| 24 | 80.463 | −5.573 | File76989.nmf | 6.49E+08 | 25740 | 27810 | File72810.nmf | 1.28E+08 | 37510 | 39580 |
| 25 | 80.42 | −5.99 | File92647.nmf | 8.75E+08 | 40350 | 42430 | File99055.nmf | 6.55E+08 | 34280 | 36360 |

In several embodiments, control system 142 also determines that the matching phrase was spoken by the single caller in a third call interaction, and adds the single caller speaking the matching phrase in the third call interaction to the audio file.

Figure 6:
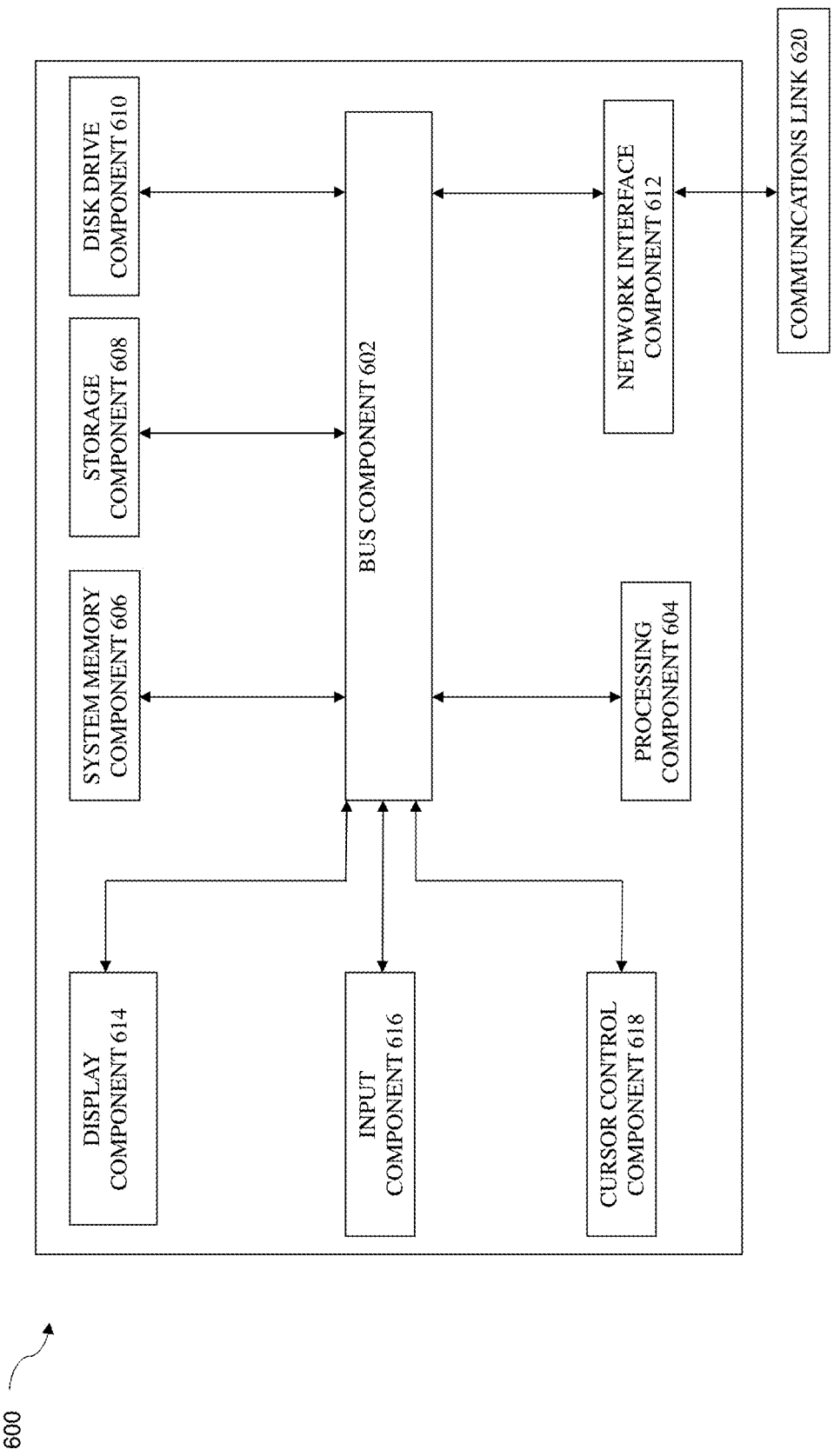
FIG. 6 is a block diagram of a computer system suitable for implementing one or more components in FIG. 1 or 2 according to one embodiment of the present disclosure.

Referring now to FIG. 6, illustrated is a block diagram of a system 600 suitable for implementing embodiments of the present disclosure, including control system 142. System 600, such as part a computer and/or a network server, includes a bus 602 or other communication mechanism for communicating information, which interconnects subsystems and components, including one or more of a processing component 604 (e.g., processor, micro-controller, digital signal processor (DSP), etc.), a system memory component 606 (e.g., RAM), a static storage component 608 (e.g., ROM), a network interface component 612, a display component 614 (or alternatively, an interface to an external display), an input component 616 (e.g., keypad or keyboard), and a cursor control component 618 (e.g., a mouse pad).

In accordance with embodiments of the present disclosure, system 600 performs specific operations by processor example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 600. In various other embodiments, a plurality of systems 600 coupled by communication link 620 (e.g., networks 102 or 104 of FIG. 2, LAN 132, WLAN, PTSN, or various other wired or wireless networks) may perform instruction sequences to practice the disclosure in coordination with one another. Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A fraud detection system comprising:
a processor and a computer readable medium operably coupled thereto, the computer readable medium comprising a plurality of instructions stored in association therewith that are accessible to, and executable by, the processor, to perform operations which comprise:
receiving a plurality of call interactions;
extracting a voice print of a caller from each of the call interactions;
determining which call interactions are associated with a single caller by comparing and matching pairs of voice prints of the call interactions;
organizing the call interactions associated with a single caller into a group; and
determining that a matching phrase was spoken by the single caller in a first call interaction and a second call interaction in the group, wherein determining that a matching phrase was spoken by the single caller in a first call interaction and a second call interaction in the group comprises:
converting a speech segment in the first call interaction and a speech segment in the second call interaction into feature vectors for each frame of speech;
calculating a distance between each frame of speech in the first call interaction and each frame of speech in the second call interaction;
storing the calculated distances in a matrix; and
starting at each frame of speech in the first call interaction and each frame of speech in the second call interaction, computing, with a sliding dynamic time warping algorithm, a warping distance.

2. The fraud detection system of claim 1, wherein the operations further comprise generating an audio file, wherein the audio file comprises the single caller speaking the matching phrase in the first call interaction and the single caller speaking the matching phrase in the second call interaction.

3. The fraud detection system of claim 2, wherein the operations further comprise presenting the audio file to a user.

4. The fraud detection system of claim 2, wherein the operations further comprise:
determining that the matching phrase was spoken by the single caller in a third call interaction; and
adding the single caller speaking the matching phrase in the third call interaction to the audio file.

5. The fraud detection system of claim 1, wherein the operations further comprise scoring each computation based on its warping distance, wherein a lower warping distance is given a higher score.

6. The fraud detection system of claim 5, wherein the operations further comprise presenting a score for the computation, and start and end times for the matching phrase in the first call interaction and the second call interaction.

7. The fraud detection system of claim 1, wherein determining that a matching phrase was spoken by the single caller in a first call interaction and a second call interaction in the group further comprises dividing each of the first call interaction and the second call interaction into a plurality of speech segments.

8. The fraud detection system of claim 1, wherein the operations further comprise filtering the plurality of call interactions to identify high-risk call interactions.

9. The fraud detection system of claim 1, wherein the operations further comprise presenting the first call interaction and the second call interaction to a user.

10. A method of detecting fraud, which comprises:
receiving a plurality of call interactions;
extracting a voice print of a caller from each of the call interactions;
determining which call interactions are associated with a single caller by comparing and matching pairs of voice prints of the call interactions;
organizing the call interactions associated with a single caller into a group; and
determining that a matching phrase was spoken by the single caller in a first call interaction and a second call interaction in the group, wherein determining that a matching phrase was spoken by the single caller in a first call interaction and a second call interaction in the group comprises:
converting a speech segment in the first call interaction and a speech segment in the second call interaction into feature vectors for each frame of speech;
calculating a distance between each frame of speech in the first call interaction and each frame of speech in the second call interaction;
storing the calculated distances in a matrix; and
starting at each frame of speech in the first call interaction and each frame of speech in the second call interaction, computing, with a sliding dynamic time warping algorithm, a warping distance.

11. The method of claim 10, which further comprises:
generating an audio file, wherein the audio file comprises the single caller speaking the matching phrase in the first call interaction and the single caller speaking the matching phrase in the second call interaction; and
presenting the audio file to a user.

12. The method of claim 11, which further comprises receiving verification from the user that the single caller is one person.

13. The method of claim 10, which further comprises presenting the first call interaction and the second call interaction to a user.

14. A non-transitory computer-readable medium having stored thereon computer-readable instructions executable by a processor to perform operations which comprise:
receiving a plurality of call interactions;
extracting a voice print of a caller from each of the call interactions;
determining which call interactions are associated with a single caller by comparing and matching pairs of voice prints of the call interactions;
organizing the call interactions associated with a single caller into a group; and
determining that a matching phrase was spoken by the single caller in a first call interaction and a second call interaction in the group, wherein determining that a matching phrase was spoken by the single caller in a first call interaction and a second call interaction in the group comprises:
converting a speech segment in the first call interaction and a speech segment in the second call interaction into feature vectors for each frame of speech;

calculating a distance between each frame of speech in the first call interaction and each frame of speech in the second call interaction;

storing the calculated distances in a matrix; and starting at each frame of speech in the first call interaction and each frame of speech in the second call interaction, computing, with a sliding dynamic time warping algorithm, a warping distance.

15. The non-transitory computer-readable medium of claim 14, wherein the operations further comprise:

generating an audio file, wherein the audio file comprises the single caller speaking the matching phrase in the first call interaction and the single caller speaking the matching phrase in the second call interaction; and presenting the audio file to a user.

16. The non-transitory computer-readable medium of claim 15, wherein the operations further comprise:

determining that the matching phrase was spoken by the single caller in a third call interaction; and adding the single caller speaking the matching phrase in the third call interaction to the audio file.

17. The non-transitory computer-readable medium of claim 14, wherein the operations further comprise presenting the first call interaction and the second call interaction to a user.

\* \* \* \* \*